(12) United States Patent
Okamura et al.

(10) Patent No.: US 11,794,334 B2
(45) Date of Patent: Oct. 24, 2023

(54) RECONFIGURABLE, ADAPTABLE ROBOTIC STRUCTURES

(71) Applicant: The Board of Trustees of the Leland Stanford Junior University, Stanford, CA (US)

(72) Inventors: Allison M. Okamura, Mountain View, CA (US); Sean Follmer, Palo Alto, CA (US); Elliot W. Hawkes, Santa Barbara, CA (US); Zachary Hammond, Stanford, CA (US); Nathan Scot Usevitch, Stanford, CA (US); Mac Schwager, Stanford, CA (US); James Ballard, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 639 days.

(21) Appl. No.: 17/017,299

(22) Filed: Sep. 10, 2020

(65) Prior Publication Data

US 2021/0078164 A1    Mar. 18, 2021

Related U.S. Application Data

(60) Provisional application No. 62/900,156, filed on Sep. 13, 2019.

(51) Int. Cl.
*B25J 9/00* (2006.01)
*B25J 9/08* (2006.01)
*B25J 9/12* (2006.01)

(52) U.S. Cl.
CPC ........... *B25J 9/0075* (2013.01); *B25J 9/0012* (2013.01); *B25J 9/08* (2013.01); *B25J 9/126* (2013.01)

(58) Field of Classification Search
CPC . B25J 9/0075; B25J 9/0012; B25J 9/08; B25J 9/126
USPC .......................... 318/568.11, 568.1, 567, 560
See application file for complete search history.

(56) References Cited

U.S. PATENT DOCUMENTS

| | | |
|---|---|---|
| 8,612,070 B2 | 12/2013 | Geoffroy |
| 9,527,261 B1 * | 12/2016 | Roper ...................... E04C 3/28 |
| 2005/0126106 A1 | 6/2005 | Murphy |
| 2018/0326577 A1 | 11/2018 | Chen |

FOREIGN PATENT DOCUMENTS

| | | |
|---|---|---|
| CN | 101664926 A | 3/2010 |
| WO | WO2017060258 A1 | 4/2017 |

OTHER PUBLICATIONS

Salehian et al. Dynamic effects of embedded macro-fiber composite actuators on ultra-light flexible structures of repeated pattern—a homogenization approach. Shock and Vibration 18 (2012) 81-100.

* cited by examiner

*Primary Examiner* — David Luo
(74) *Attorney, Agent, or Firm* — LUMEN PATENT FIRM

(57) ABSTRACT

Adaptable and customizable truss-like robots are provided. The robotic truss has robotic roller modules configured to translate along one or more pliable member and therewith control the shape or design of the robot.

8 Claims, 3 Drawing Sheets

RECONFIGURABLE, ADAPTABLE ROBOTIC STRUCTURES

CROSS-REFERENCE TO RELATED APPLICATIONS

This application claims priority from U.S. Provisional Patent Application 62/900,156 filed Sep. 13, 2019, which is incorporated herein by reference.

STATEMENT OF GOVERNMENT SPONSORED SUPPORT

This invention was made with Government support under contracts 1637446, 1925030 and 1925373 awarded by the National Science Foundation, and under contract D18AP00064 awarded by the Defense Advanced Research Projects Agency. The Government has certain rights in the invention.

FIELD OF THE INVENTION

The present invention relates generally to robotics. More particularly, the invention relates to reconfigurable, adaptable robotic structures.

BACKGROUND OF THE INVENTION

For robots to work in conjunction with humans and be useful outside of highly engineered environments, they must be human-safe, robust, adaptable to a variety of scenarios, and capable of moving through diverse types of terrain. These attributes require not only adaptable control algorithms and the collection and processing of rich sensory information, but also new forms of reconfigurable, adaptable robotic structures, which are potentially soft in nature. This present invention is directed to such robotic structures and control mechanisms.

SUMMARY OF THE INVENTION

The present invention provides a robotic truss. The robotic truss has a robotic roller module which is configured to translate along a pliable member. Examples of pliable members are inflatable tubes, bistable composite tubes, bistable composite partial tubes, bistable metal tubes or bistable partial metal tubes.

A proximal end of the pliable member is disposed on a first side of the robotic roller module, and a distal end of the pliable member is disposed on a second side of the robotic roller module.

A dynamic angle is formed between the proximal pliable member end and the distal pliable member end. The dynamic angle is in a range of 0-180 degrees and dependent on a position of the robotic roller module along the pliable member.

A length of the proximal pliable member end and the distal pliable member end is according to a position of the roller module along the pliable member. The position of the robotic roller module along the pliable member is set according to a determined number of revolutions of opposing roller elements in the robotic roller module.

The robotic roller module could have a controller to control the position of itself along the pliable member.

The robotic truss could have a plurality of the robotic roller modules each configured to translate along the same pliable member. The robotic roller modules are distributed over the pliable member. In another embodiments, there could be a plurality of pliable members.

The robotic truss further could have a plurality of the robotic roller modules each configured to translate along the pliable member. Each of the plurality of the robotic roller modules has a controller to control the position of the respective robotic roller module along the pliable member.

The robotic truss could have a plurality of the robotic roller modules where each of the robotic roller module can be detachably connected with another the robotic roller module.

The pliable member proximal end or the pliable member distal end can be connected to a fixed object.

Sensors could be integrated in or with the pliable member as well as the roller module to provide feedback and improve control of the robotic truss.

End-effectors could be added to the roller modules such as grippers, suction mechanisms, cameras, robotic arms, inflatable bladders, or the like.

Distributed control of the robotic roller modules could be integrated where the modules could communicate with their neighboring modules to coordinate their motions along the inextensible members to correspond with motions of the robotic modules through space.

A state estimation algorithm could be provided enabling the robot to determine the position of all of the different modules in space using only information that can be locally measured by each module. This information includes the distances between pairs of modules, the orientation of the modules in space as measured by an inertial measurement unit, and the orientation of the inextensible members as they leave the module. This algorithm is able to determine the position of the modules along the inextensible members, as well as the location of inextensible members. In one embodiment, the plurality of robotic modules measures their absolute position with respect to their neighboring modules by transmitting and receiving acoustic signals that travel through said members. According to another embodiment, self-recovery is provided, where the estimation of the state enables the robotic modules to determine the location of buckles within said members and to decide a control action that will straighten the members and restore rigidity to the structure.

An electromechanical device could be integrated to induce deformation of the members such that elastic energy can be stored and subsequently released for fast dynamic motions (such as jumping, throwing an object, etc.).

As a truss-like robot, embodiments of the invention are adaptable and customizable. Since all of its edges are highly compliant pneumatic beams, it overcomes the limitations of traditional mechatronic truss robots that are rigid, slow, heavy, and limited to small morphology changes. As a soft robot, embodiments of the invention are inherently human-safe, has a high tolerance to uncertainty in the environment, and has a low cost and barrier-to-entry. Since it is a constant volume system, it overcomes a fundamental limitation of pneumatic soft robots—the air supply. As a collective system of robots under distributed control, embodiments of the invention are inherently robust to subsystem failure, making it reliable in real-world scenarios. Since the robots are interconnected with a shape-morphing physical network, simple robots can work together to apply forces in three dimensions to the human world. This overcomes a limitation of collective robots that are challenged to realize such complex 3-D physical interaction while maintaining simplicity at the individual robot level. The simplicity of the roller modules and the fact that the roller modules are identical means that the robot can reconfigured to different shapes by routing the pliable members differently through the same set of roller modules. This system allows many different robots to be created from the same set of roller modules and pliable members.

DETAILED DESCRIPTION

Figure 1:
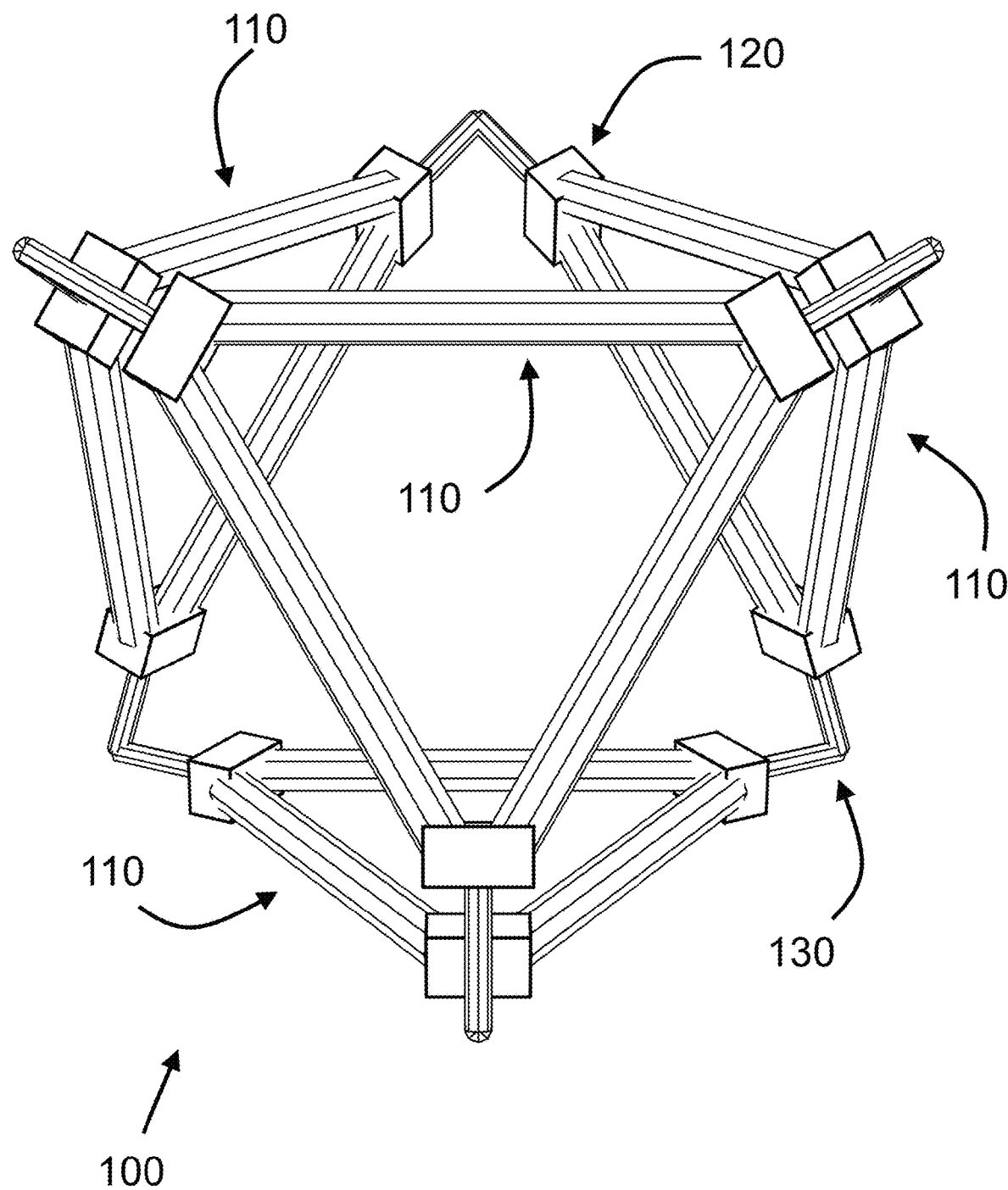
FIG. 1 shows according to an exemplary embodiment of the invention a reconfigurable adaptable robotic structure 100 with four pliable members 110 each controlled with robotic roller modules 120. Detachable connectors 130 can be used between robotic roller modules to design various shapes and dimensions.
Figure 2:
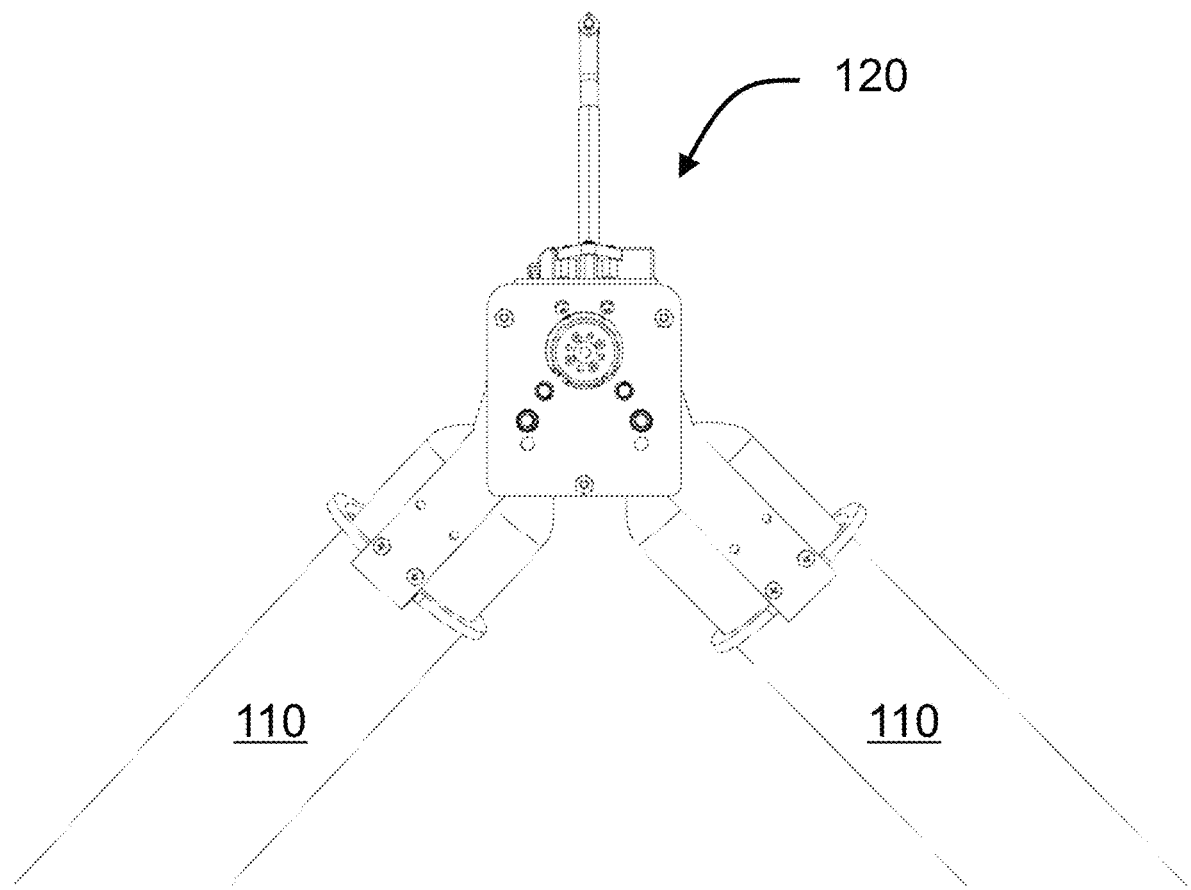
FIGS. 2-3 shows according to an exemplary embodiment of the invention a robotic roller module. 310 is a motor, 320 is a microcontroller, 330 are driver rollers, 340 is the portion of the pliable member 110 that is squeezed by the robotic roller module by the driver rollers 330, and 350 is an example of a passive bisection mechanism (only marked on one side, but also present at other side of the robotic roller module.

FIG. 1 shows a reconfigurable, adaptable robotic structure. In an exemplary embodiment, such robotic structure 100 is shown as a truss of inextensible, inflatable, constant-length tubes 110 that are manipulated by a collective of interconnected roller modules 120, allowing for shape change and compliance without a pressure source. Pressurized tubes serve as structural elements and the edges of the truss. Each joint in the tubing is formed by a robotic roller module that pinches the tube between cylindrical rollers without creating a seal (FIG. 2). The roller modules can be connected (130) to neighboring modules to form a node of a complex two-dimensional (2D) or 3D structure.

An electric motor and mechanical transmission then drive these rollers like wheels along the tube, causing the pinch point to translate (FIG. 2). Edge lengths of the robot are changed not by stretching or contracting the edges, but by movement of the roller module along the tube; moving the effective joint and simultaneously lengthening one edge while shortening another. The sum of all the edge lengths remains constant. Therefore, the robot is called an isoperimetric system (constant perimeter). A gap between the rollers ensures that as they move, there is negligible pressure difference between the two edges, leading to a system with constant volume that does not require a pressure source. The individual roller modules are capable of moving along the tube in only one degree of freedom, yet the overall collective is capable of complex behavior.

As a collective system of robots, the concept provided herein is inherently modular with interchangeable (one degree of freedom) subunit roller modules. However, because the subunits are physically interconnected through a compliant network, the collective achieves complex system-level behavior, capable of applying forces in three dimensions on a large scale. This overcomes a limitation of collective robots that combine together to create structures that can change their shape realizing complex 3D physical interaction while maintaining simplicity at the individual robot level. The collective continuously deforms passive bodies to change the locations of where the bodies are attached, resulting in very simple robotic subunits.

As a truss-like robot, which has for applications like exploring planets, burrowing underground, shoring up rubble, and modular robotic systems, the robotic concept of this invention is adaptable and customizable. However, because the robot has a compliant structure and moves without requiring linear actuators, it affords robustness that is lacking in other truss-like robots. Ideally, the linear actuators of a truss robot would be lightweight, be robust, have a high extension ratio, and operate untethered. The robot overcomes some of the challenges of conventional truss robots because the structure is composed of lightweight compliant pneumatic beams.

As a soft robot, the concept is inherently human-safe and has a high tolerance to uncertainty in the environment. However, because it is a constant-volume, isoperimetric system (nodes move, but the total length of the pneumatic structure remains the same), it overcomes a fundamental limitation of pneumatic soft robots, which is the air supply.

2D Collective Demonstrating Truss-Like Shape Change

The collective and modular nature of the isoperimetric concept was demonstrated by constructing two different 2D robots with the same roller modules. A first robot is composed of three separate tubes, and a second is composed of a single tube. Robots with multiple tubes are interesting because the modularity is extended to robotic substructures containing multiple roller modules. For example, substructures designed for specific tasks, like grasping or locomotion, could be combined to form a variety of robots. On the other hand, robots with a single tube have fewer constraints on their configuration and larger maximum edge lengths. With both robots, a truss-like shape-changing ability was demonstrated.

For the first robot, each of the three individual tubes (3.4 m long and 0.1 m diameter) was routed through two active roller modules before affixing its ends to a passive module that did not contain a motor, creating a triangle. The triangular substructures were then assembled by connecting pairs of roller modules with revolute joints, showing that complex robots can be assembled from multiple simpler robots. The robot could deploy from a small area of 0.85 m$^2$ without human intervention when air was added from an external source. After the robot was inflated to an operating pressure of 0 kPa (and an area of 2.9 m$^2$), the tether was removed and drove the roller modules to demonstrate a few feasible shapes: a tall skinny triangle, a hexagon, a square, and a "pincer" shape that could grasp an object. It took less than 50 seconds for the robot to transition among all four of these shapes. The minimum length of an edge was 28 cm for this prototype and was fixed by the size of the roller module.

For the second robot, a single tube with a length of 6.8 m was routed through eight active roller modules and a single passive module. This single-tube architecture enabled certain behaviors that were not possible with the first, three-triangle architecture, where an edge could only lengthen if another edge in the same triangle shortens. In contrast, when a single tube was used for the entire robot, the material could be exchanged between any two edges in the network. To exchange length between edges that are adjacent, one roller module moved along the tube. For edges that are not adjacent, all intermediate powered roller modules must roll to transfer the tube material, even if the edges adjacent to the intermediate roller modules do not change length. Because any edge in the robot can contribute length to any other edge, much larger maximum edge lengths could be reached with the single-tube architecture, illustrating that the maximum length of an edge depends on the robot architecture.

3D Octahedron Robot: Truss-Like Shape Change and Locomotion

In this example, the same roller modules were used from the 2D robots to create a 3D octahedron, formed by connecting four individual triangles, each with a tube length of 3.4 m. As before, a triangle has two active and one passive modules. A first demonstration of the 3D robot explored its volume change during deployment. The structure could compact to a volume of 0.173 m$^3$ when deflated (fitting within a 64 cm by 71 cm by 38 cm rectangular prism) and then deploy to an octahedron with a volume of 2.29 m$^3$, increasing by a factor of 13. Next, after untethering the robot, it is then capable of markedly changing its shape, including changing its height by a factor of 2 and moving to an asymmetric configuration where one node extends upward. In a second demonstration, the robot could locomote with a punctuated rolling gait at a speed of 2.14 body lengths/minute, or 3.6 m/min.

3D Octahedron Robot: Compliant Behavior and Manipulation

The inflated fabric tubes are compliant, a hallmark of soft robots and a property that affords robustness to the structure. To demonstrate this robustness, the robot was loaded with a wooden pallet before increasing the load until structural failure. When the load was removed and external forces were applied to restore the structure to its initial shape, it was again able to support the initial load, undamaged. To quantify the response of the robot under load, the force was measured while displacing the top roller module of a single triangle in three different configurations. When an external load was applied to a node of the truss structure, there was a relatively high initial stiffness until the load causes one of the beams to buckle, at which point the force exerted at the node markedly decreases, approaching a zero-stiffness regime. This behavior is like a mechanical fuse: During normal operation, the structure is relatively stiff, allowing functionality; yet, beyond some threshold force, it buckles, limiting damage to itself or the environment. The exact level of the threshold force could be tuned via control of the robot configuration, leveraging existing work on the mechanics of inflated beams. Because of its relatively high stiffness before buckling, the robot can carry heavy loads without substantial deformation. Using a kinematics model, one would be able to predict the forces experienced by the members.

Different recovery strategies can be invoked after an inflated beam buckles. Occasionally, the beam will recover on its own when the load is removed. This is due to the small, but noticeable restoring forces. If a beam is unable to recover passively, it is possible for active motions of the roller modules to assist in straightening buckled beams.

The compliance of the robot allows it to grasp and manipulate objects. For example, the robot can change shape to engulf an object, e.g. a basketball, before changing shape to pinch the object between two of its edges. The compliant beams bent slightly around the object, increasing the contact area. Once the object was grasped, it changed the shapes of its other faces to pick the object up from the ground. The robot could also manipulate objects "in hand," leveraging the fact that the edges are composed of continuous tubes that move relative to the nodes. By driving the roller module closest to the basketball, the tube moved relative to the basketball, causing the ball to rotate within the grasp.

Robot Subcomponent Analysis and Design

Figure 3:
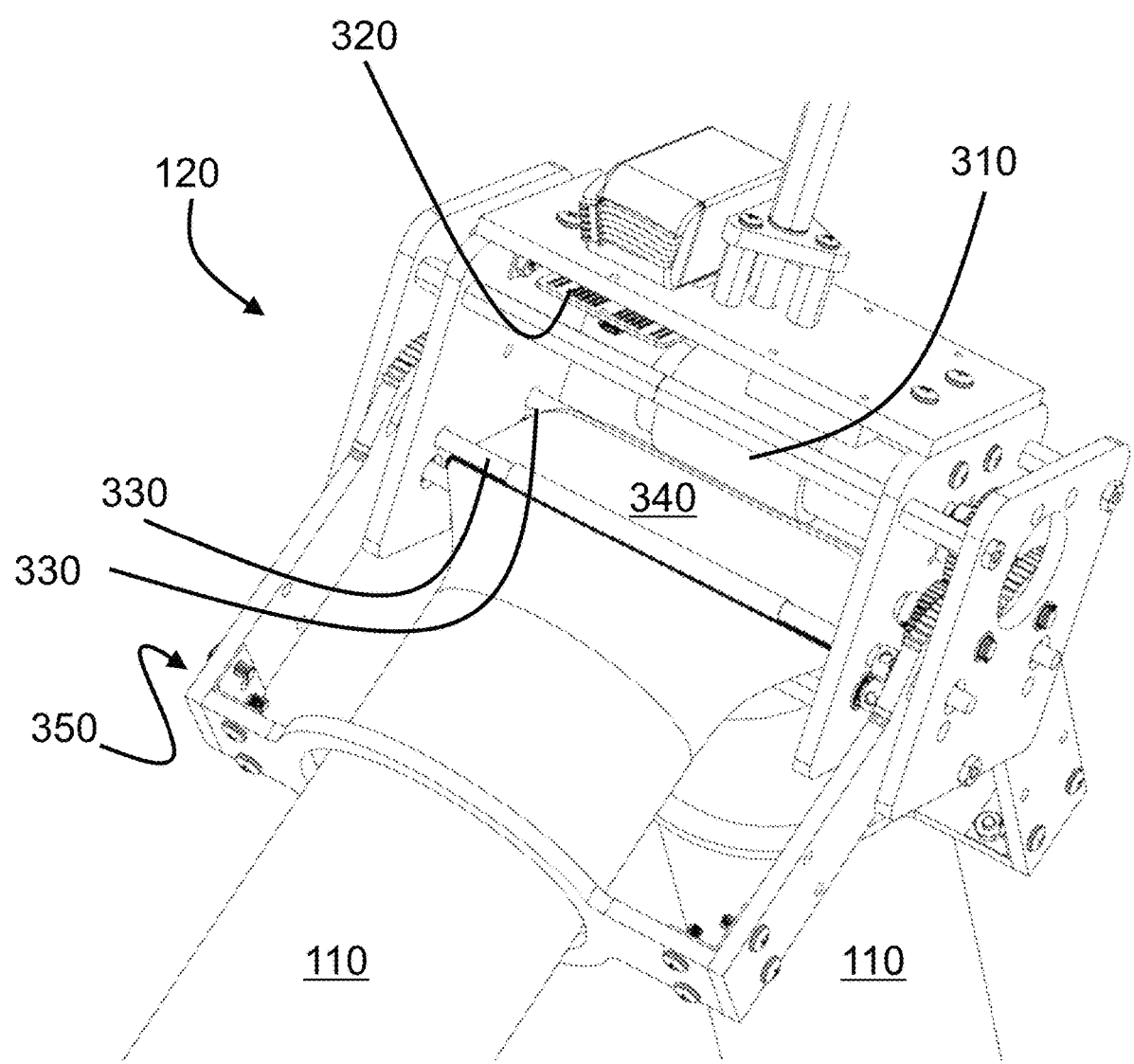

The key components of the robot are the tubes and the actuated roller modules as shown in FIGS. 2-3. Each roller module in the robot serves three primary functions:

(i) to pinch the tube, creating a region of low bending stiffness—an effective joint;
(ii) to locomote along the length of the tube, moving the position of the effective joint; and
(iii) to mechanically couple to other roller modules in the structure in a way that fully defines the geometry of the robot.

Joint-Like Behavior of a Pinched Tube

The effective joints, about which two sections of tube pivot, are created by the cylindrical rollers in the roller modules. The rollers pinch the tube, reducing its cross-sectional area and bending stiffness while still allowing airflow. Ideally, there would be no torque required to change the angle, but in practice, there could be a torque at these joints.

Locomotion Along an Inflated Tube

The second requirement of the roller module is to continuously move the joint along the structure, which it does by rotating the rollers with a motor. Because the gap between the rollers is smaller than the diameter of the tube, the rollers experience a high normal force pushing them apart. This, when coupled with a high-friction coating on the cylinders, ensures a large friction force between the tube and the rollers and prevents slip.

In an ideal case, the energetic cost to move the roller along the tube would be zero and invariant to changes in the internal pressure of the system. However, the presence of friction and hysteresis in the deformation of the fabric results in an energetic cost to travel a distance, which we seek to minimize.

Having examined the geometric effects on joint stiffness and the cost to move, one could make some design decisions. Using smaller rollers reduces the joint stiffness and decreases the cost to move. Therefore, using small rollers is preferable for performance. Increasing the spacing between the pairs of rollers not only decreases the minimum angle before tube interference, but also increases the cost to move. In one example for the roller modules, the inventors selected a roller diameter of 0.76 cm and set the distance between the center axis of the rollers at 1.27 cm. The distance between the two pairs of rollers was 6.35 cm. In practice, both sets of rollers were driven with a single motor through the gear train.

Roller Connections

The third requirement of the roller module is the ability to mechanically couple to other roller modules in the structure to fully define the robot's geometry for both 2D and 3D architectures. The roller modules connect to each other at nodes using three-degree-of-freedom universal joints that are composed of a clevis joint that couples two rods, each free to spin about its axis. The length of these rods is determined by the size of the roller modules and the necessary minimum angle between these rods.

The mechanical design of the roller modules and the connections between them must fully constrain the truss structure. Fully constrained means that any external load induces a restoring force that seeks to return the structure back to an equilibrium configuration. A kinematic analysis performed by the inventors indicated that the structure is fully constrained if the connection point between a roller module and its neighbor lies along the line that bisects the two segments of tube joined by that roller. To achieve this constraint, two guide rings were included. Each guide ring was attached to the body of the roller module through arms that rotate about a pin joint concentric with the top roller in a pair of rollers. In addition, gear teeth were placed on the arms supporting the guide rings to couple the motion of the guide rings. These arms are referred to as geared angle constraints or passive bisection mechanisms 350 (FIG. 3). Together, the guide rings and the geared angle constraints ensured that a central axis of the roller module bisects the two segments of tube, which, in turn, ensured that the truss structure is fully constrained.

Exemplary Materials and Methods

The following description of materials and methods is illustrative and as a skilled artisan would readily appreciate could be varied to specific design objectives and applications.

Construction

Inflatable tubes were constructed out of an outer layer of heavy fabric and an inner air-tight bladder. A commercially available fabric was selected with minimal stretch along the 45° bias. This fabric is a 200-denier nylon fabric with an oxford weave and a urethane coating (Seattle Fabrics Inc.). The fabric was cut into a long rectangular piece and sewn together with a plain seam and a straight stitch. A small hole was punched into the fabric for a pressure line connector. The inner bladder was formed from a low-density polyethylene tube (Hudson Exchange). This tube was cut to length, a hole was punched in its side for the fitting, and the ends were heat-sealed. The inner bladder was inserted into the fabric outer layer, and the ends of the outer layer were sewn shut with a straight stitch. Last, a threaded through-wall pipe fitting was fastened in place where the holes in each layer aligned. In practice, we inflated the tubes to about 40 kPa.

The housing of the roller module was created with laser-cut polyoxymethylene sheets. These pieces were fastened together with stand-offs and corner brackets. The housing contained holes to lightly press fit ball bearings that support the rotation of the rollers and the gear train. The rollers were steel D-shafts wrapped in a nonslip material (Dycem). External grooves were cut into the rollers, where retaining rings were placed to locate the rollers with respect to the ball bearings. The custom gear train had a speed multiplier of 3, which was selected for geometric convenience. The gear train was driven by a direct current motor with a planetary, reducing gear box with a gear ratio of about 139:1 (ServoCity #638320). The motor was driven by a Cytron MD10C motor driver in a drive-brake control method. The motor driver was commanded by a Teensy 3.2 microcontroller, which used an nRF24101+ radio transceiver to receive position commands from an off-board laptop. The laptop was not a necessary component because the position commands could be stored on the microcontroller. The laptop provided a convenient user interface to send commands to the microcontrollers. When multiple roller modules were connected at a vertex, a single microcontroller controlled all the connected roller modules. When possible, the passive modules were connected together to reduce the number of microcontrollers. Power was delivered to each roller module by a 1300-mAh, 75-C, 14.8-V lithium polymer battery manufactured by Tattu. The mass of each roller module was 2.83 kg, and each passive module weighed 1.6 kg. The complete octahedron robot (eight active roller modules, four passive modules, and the fabric tubes) weighed about 29 kg. The 2D robots weighed 22 kg (three tubes) and 19 kg (single tube).

Control

In the example, each roller module was responsible for controlling its position in 1D along the inflated tube. The microcontroller tracked the position of the connected roller modules along their tubes using the motor encoders and used a proportional-integral-derivative (PID) controller to drive the rollers to the target position. To determine the desired commands to broadcast to the robot, different commands were experimented with using a computer simulation that propagated the kinematics presented in the next section.

What is claimed is:

1. A robotic truss, comprising:
   a robotic roller module configured to translate along a pliable member,
   wherein a proximal end of the pliable member is disposed on a first side of the robotic roller module, wherein a distal end of the pliable member is disposed on a second side of the robotic roller module,
   wherein a dynamic angle is formed between the proximal pliable member end and the distal pliable member end,
   wherein said dynamic angle is in a range of 0-180 degrees and dependent on a position of the robotic roller module along the pliable member,
   wherein a length of the proximal pliable member end and the distal pliable member end is according to a position of said roller module along the pliable member, and
   wherein the position of the robotic roller module along the pliable member is set according to a determined number of revolutions of opposing roller elements in the robotic roller module.

2. The robotic truss as set forth in claim 1, wherein the pliable member is selected from the group consisting of an inflatable tube, bistable composite tubes, bistable composite partial tubes, bistable metal tubes, and bistable partial metal tubes.

3. The robotic truss as set forth in claim 1, wherein the robotic roller module has a controller to control the position of the robotic roller module along the pliable member.

4. The robotic truss as set forth in claim 1, comprises a plurality of the robotic roller modules each configured to translate along the pliable member.

5. The robotic truss as set forth in claim 1, comprises a plurality of the robotic roller modules each configured to translate along the pliable member and distributed over the pliable member.

6. The robotic truss as set forth in claim 1, comprises a plurality of the robotic roller modules each configured to translate along the pliable member and wherein each of the plurality of the robotic roller modules has a controller to control the position of the respective robotic roller module along the pliable member.

7. The robotic truss as set forth in claim 1, comprises a plurality of the robotic roller modules, wherein each of the robotic roller module is detachably connected with another robotic roller module.

8. The robotic truss as set forth in claim 1, wherein the pliable member proximal end or the pliable member distal end are connected to a fixed object.

\* \* \* \* \*